United States Patent
Kim et al.

(10) Patent No.: US 8,797,937 B2
(45) Date of Patent: Aug. 5, 2014

(54) SYSTEM AND METHOD FOR PROVIDING MULTICAST AND BROADCAST SERVICE SUPPORTING MACRO DIVERSITY

(75) Inventors: Bong-Ho Kim, San Jose, CA (US); Su-Lyun Sung, Anyang (KR)

(73) Assignee: Intellectual Discovery Co., Ltd., Seoul (KR)

( * ) Notice: Subject to any disclaimer, the term of this patent is extended or adjusted under 35 U.S.C. 154(b) by 395 days.

(21) Appl. No.: 13/255,100

(22) PCT Filed: Mar. 8, 2010

(86) PCT No.: PCT/KR2010/001441
§ 371 (c)(1), (2), (4) Date: Sep. 6, 2011

(87) PCT Pub. No.: WO2010/101449
PCT Pub. Date: Sep. 10, 2010

(65) Prior Publication Data
US 2011/0317612 A1 Dec. 29, 2011

Related U.S. Application Data

(60) Provisional application No. 61/158,238, filed on Mar. 6, 2009.

(51) Int. Cl.
*H04H 20/71* (2008.01)
(52) U.S. Cl.
USPC ............................................. 370/312
(58) Field of Classification Search
CPC ........... H04W 4/06; H04W 4/00; H04W 4/08; H04W 8/00; H04B 7/2125
USPC ................................ 370/310, 312, 310.2, 332
See application file for complete search history.

(56) References Cited

U.S. PATENT DOCUMENTS

| 7,903,540 B2 * | 3/2011 | Shousterman et al. | 370/216 |
| 2009/0103467 A1 * | 4/2009 | Barber et al. | 370/312 |

FOREIGN PATENT DOCUMENTS

| KR | 1020050043235 A | 5/2005 |
| KR | 1020070081398 A | 8/2007 |
| KR | 1020080083088 A | 9/2008 |

OTHER PUBLICATIONS

International Search Report for application PCT/KR2010/001441 filed on Mar. 8, 2010.
Written Opinion of the International Searching Authority for application PCT/KR2010/001441 filed on Mar. 8, 2010.

* cited by examiner

*Primary Examiner* — Anh Ngoc Nguyen

(57) ABSTRACT

The present invention relates to a multicast and broadcast service (MCBCS) system and method. According to the present invention, the MCBCS system comprises: an MBS distribution DPF (Data Patch Function) for receiving MBS data from an MCBCS server/controller and distributing the data; an MBS synchronization controller for acquiring GRE (Generic Routing Encapsulation) for the MBS data from the MBS distribution DPF and then generating an MBS synchronization rule; an MBS synchronization executor for executing MBS synchronization on the MBS synchronization rule received from the MBS synchronization controller; and an MBS DPF for receiving MBS data from the MBS distribution DPF, packaging the MBS data into an MBS burst and then transmitting the data to an MS (Mobile station). As such, multicast and broadcast services can be provided efficiently.

20 Claims, 9 Drawing Sheets

SYSTEM AND METHOD FOR PROVIDING MULTICAST AND BROADCAST SERVICE SUPPORTING MACRO DIVERSITY

TECHNICAL FIELD

The present invention relates generally to a multicast and broadcast service system and method, and more particularly to a multicast and broadcast service system and method which support macro diversity by using a synchronization rule in a wireless communication environment.

BACKGROUND

Wireless communication system has developed as a form that can provide various services including broadcast, multimedia video, multimedia message, etc. Research on the next-generation communication system is being conducted to provide users with various QoS (Quality of Service) services at a high data rate. Particularly, current research on the next-generation communication system is being conducted to guarantee mobility and QoS and to provide stable services at high speed. In relation to this, portable internet system or WiMAX system based on an IEEE (Institute of Electrical and Electronics Engineers) 802.16/WiMAX standard is a representative communication system.

However, in current system based on the IEEE 802.16/WiMAX standard, there is no detailed procedure for performing MCBCS (multicast and broadcast service). Therefore, there is a demand for new scheme that can efficiently perform MCBCS.

Particularly, there is a demand for new scheme that all base station (hereinafter, referred to as 'BS') in an MBS (multicast and broadcast service) zone can generate the same MBS frame at the same time through the same scheduling to support macro diversity. Also, there is a demand for complementary measures that can efficiently settle problems regarding synchronization, MBS data loss, etc.

DISCLOSURE

Technical Problem

Therefore, the present invention has been made in view of the above-mentioned demands, and it is an object of the present invention to provide a multicast and broadcast service system and method that can support macro diversity.

It is another object of the present invention to provide a multicast and broadcast service system and method that can efficiently define synchronization rule coverage and recover data loss by including GRE SN (Generic Routing Encapsulation Sequence Number) into MBS synchronization rule.

It is further another object of the present invention to provide a multicast and broadcast service system and method that can efficiently provide services despite losing MBS data packet by including data size into MBS synchronization rule.

It is further another object of the present invention to provide a multicast and broadcast service system and method based on the IEEE 802.16/WiMAX standard.

Technical Solution

According to one aspect of the present invention, there is provided a multicast and broadcast service method comprising: transmitting an MBS (multicast and broadcast service) Synchronization Rule to a BS (Base Station), by an ASN-GW (Access Service Network-Gateway); if the BS does not receive a next MBS Synchronization Rule until next MBS Synchronization Rule expected TOA (Time of Arrival) included in the MBS Synchronization Rule, transmitting a Recovery Request for a missing MBS Synchronization Rule to the ASN-GW, by the BS; and retransmitting the missing MBS Synchronization Rule to the BS, by the ASN-GW.

According to another aspect of the present invention, there is provided a multicast and broadcast service method comprising: transmitting an MBS (multicast and broadcast service) data to a BS (Base Station), by an ASN-GW (Access Service Network-Gateway); detecting loss of the MBS data by referring a GRE (Generic Routing Encapsulation) SN (Sequence Number) included in the MBS Synchronization Rule, and if the loss of the MBS data is detected, transmitting a Recovery Request for a missing MBS data to the ASN-GW, by the BS; and retransmitting the missing MBS data to the BS, by the ASN-GW.

According to further another aspect of the present invention, there is provided a multicast and broadcast service method comprising: accumulating MBS data packets received from an MCBCS (multicast and broadcast service) Server/Controller during the predetermined period, by an ASN-GW (Access Service Network-Gateway); generating an MBS Synchronization Rule by allocating GRE (Generic Routing Encapsulation) SN (Sequence Number) for the MBS data packets and transmitting the MBS Synchronization Rule to a BS (Base Station), by the ASN-GW; if the BS receives the MBS Synchronization Rule successfully, transmitting the MBS data packets accumulated during the predetermined period to the BS, by the ASN-GW; and packaging the MBS data packets into an MBS burst by referring the GRE SN included in the MBS Synchronization Rule and transmitting the MBS burst to an MS (Mobile Station), by the BS.

Meanwhile, according to one aspect of the present invention, there is provided a multicast and broadcast service system comprising: an MBS (multicast and broadcast service) Distribution DPF (Data Patch Function) for receiving and distributing MBS data; an MBS Synchronization Controller for generating and transmitting an MBS Synchronization Rule that includes GRE (Generic Routing Encapsulation) SN (Sequence Number) for the MBS data; an MBS Synchronization Executor for receiving the MBS Synchronization Rule from the MBS Synchronization Controller and executing MBS synchronization according to the MBS Synchronization Rule; and an MBS DPF for receiving MBS data from the MBS Distribution DPF, packaging the MBS data into an MBS burst, and transmitting the MBS burst to an MS (Mobile Station).

According to another aspect of the present invention, there is provided a multicast and broadcast service system comprising: an MBS (multicast and broadcast service) Distribution DPF (Data Patch Function) for receiving MBS data packets, distributing the MBS data packets to the corresponding MCBCS Service Flow, and assigning GRE (Generic Routing Encapsulation) SN (Sequence Number) for the MBS data packets; an MBS Synchronization Controller for generating an MBS Synchronization Rule that is applied to the MBS data packets; and an MBS Synchronization Executor for receiving the MBS Synchronization Rule and executing MBS synchronization for the MBS data packets according to the MBS Synchronization Rule, wherein the MBS Distribution DPF and the MBS Synchronization Controller are located in an ASN-GW (Access Service Network-Gateway).

Advantageous Effects

The present invention can efficiently implement macro diversity and MCBCS (multicast and broadcast service) based on the IEEE 802.16/WiMAX standard.

The present invention can efficiently define synchronization rule coverage and recover data loss by including GRE SN (Generic Routing Encapsulation Sequence Number) into MBS synchronization rule.

Also, the present invention can efficiently provide MCBCS despite losing MBS data packet by including data size into MBS synchronization rule.

DESCRIPTION OF THE DRAWINGS

The above and other aspects, features and advantages of the present invention will become more apparent from the following detailed description when taken in conjunction with the accompanying drawings in which.

MODE FOR INVENTION

Figure 1:
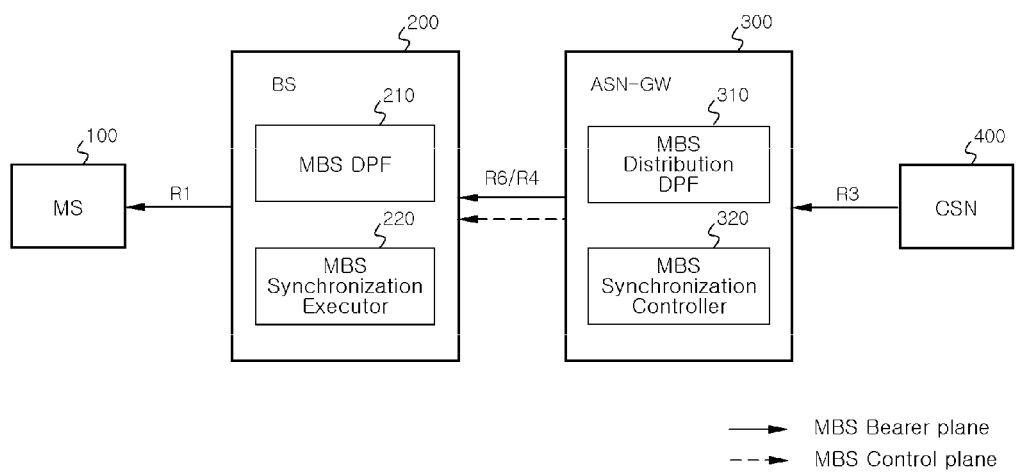
FIG. 1 is a diagram illustrating a structure of an MCBCS system according to a first embodiment of the present invention.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

First of all, terms used in invention will now be described briefly before specifically describing a multicast and broadcast service system and method according to the present invention.

Broadcast service is a unidirectional point-to-point service that transmits data from a single source to a plurality of mobile stations (hereinafter, referred to as 'MSs') in a broadcast service zone.

Multicast service is a unidirectional point-to-point service that transmits data from a single source to a multicast group in a multicast service zone. The multicast service is different from the broadcast service in that the multicast service is provided to users that have subscribed to a multicast service and joined in a multicast group related to the subscribed multicast service.

IP multicast group means a set of MSs that are identified by a single IP multicast destination address. IP multicast group is allocated by an MCBCS Server/Controller and a multicast datagram is transmitted to all members of a corresponding MS group.

Meanwhile, in the present invention, the multicast and broadcast service is separately mentioned as MBS or MCBCS depending on layer. The MBS denotes a multicast and broadcast service provided by MAC layer and/or PHY layer, and the MCBCS denotes a multicast and broadcast service provided by network layer and/or upper layer thereof. However, separated use of these terms is not strictly applied. It is understood that both MBS and MCBCS denote the multicast and broadcast service.

MBS zone corresponds to a set of BSs that use the same CID (Connection Identifier) and SA (Services & System Aspects) to transmit MCBCS contents CID. Therefore, MBS zone can be identified by unique MBS zone identifier. For example, in downlink multicast service of the same MBS zone, the same MCID (Multicast Connection Identifier) and SA are allocated to all MSs that have the same air connection. Herein, MBS zone can include one or more ASN (Access Service Network) of a NAP (Network Access Provider) and can be used in common by one or more NAPs.

Hereinafter, with reference to FIGS. 1 to 9, MCBCS system and method according to the present invention will now be described.

FIGS. 1 to 4 are diagrams illustrating structures of MCBCS system according to the present invention. For reference, MCBCS system according to the present invention can be implemented on WiMAX network.

FIG. 1 is a diagram illustrating a structure of an MCBCS system according to a first embodiment of the present invention.

Referring to FIG. 1, the MCBCS system according to the present invention includes an MS (Mobile Station) 100, a BS (Base Station) 200, an ASN-GW (Access Service Network-Gateway) 300, a CSN (Connectivity Service Network) 400, etc. Herein, the BS 200 includes an MBS DPF (MBS Data Path Function) 210 and an MBS Synchronization Executor 220. The ASN-GW 300 includes an MBS Distribution DPF (MS Distribution Data Path Function) 310 and an MBS Synchronization Controller 320. Then, although not seen in FIG. 1, the CSN 400 can include an MCBCS Server/Controller, a Subscriber Profile Database, an AAA (Authentications, Authorizations, and Accounting), etc.

Figure 2:
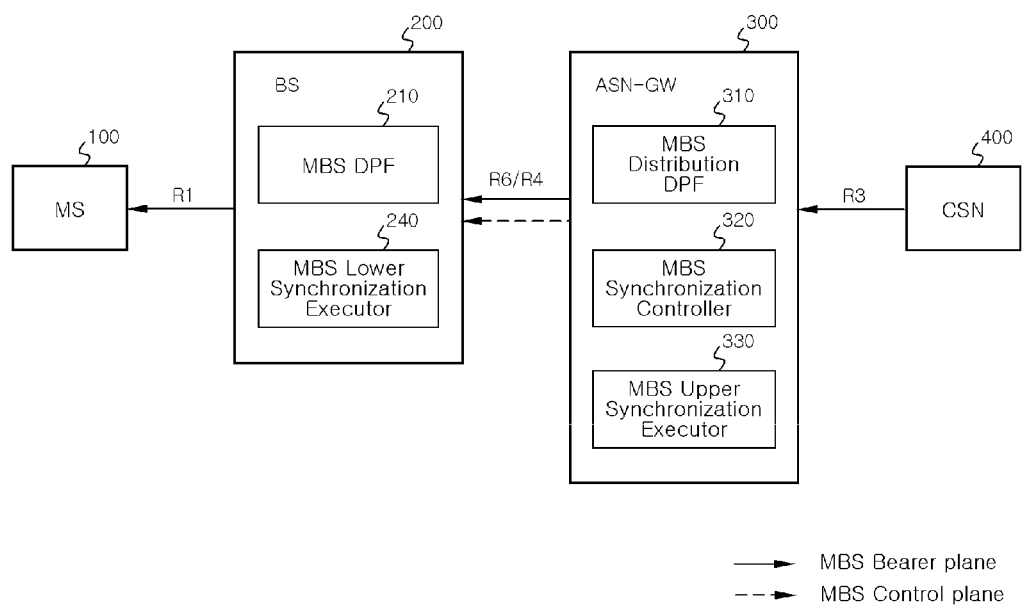
FIG. 2 is a diagram illustrating a structure of an MCBCS system according to a second embodiment of the present invention.

FIG. 2 is a diagram illustrating a structure of an MCBCS system according to a second embodiment of the present invention.

Referring to FIG. 2, the MCBCS system according to the present invention includes an MS 100, a BS 200, an ASN-GW 300, a CSN 400, etc. Herein, the BS 200 includes an MBS DPF 210 and an MBS Lower Synchronization Executor 240. The ASN-GW 300 includes an MBS Distribution DPF 310, an MBS Synchronization Controller 320, and an MBS Upper Synchronization Executor 330. Then, although not seen in FIG. 2, the CSN 400 can include an MCBCS Server/Controller, a Subscriber Profile Database, an AAA, etc.

Figure 3:
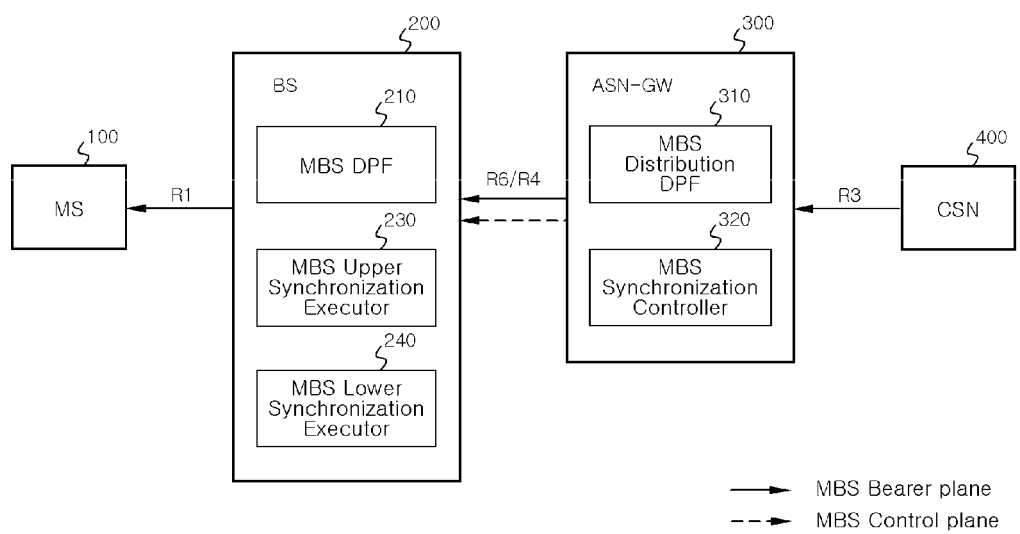
FIG. 3 is a diagram illustrating a structure of an MCBCS system according to a third embodiment of the present invention.

FIG. 3 is a diagram illustrating a structure of an MCBCS system according to a third embodiment of the present invention.

Referring to FIG. 3, the MCBCS system according to the present invention includes an MS 100, a BS 200, an ASN-GW 300, a CSN 400, etc. Herein, the BS 200 includes an MBS DPF 210, an MBS Upper Synchronization Executor 230, and an MBS Lower Synchronization Executor 240. The ASN-GW 300 includes an MBS Distribution DPF 310 and an MBS Synchronization Controller 320. Then, although not seen in FIG. 3, the CSN 400 can include an MCBCS Server/Controller, a Subscriber Profile Database, an AAA, etc.

Figure 4:
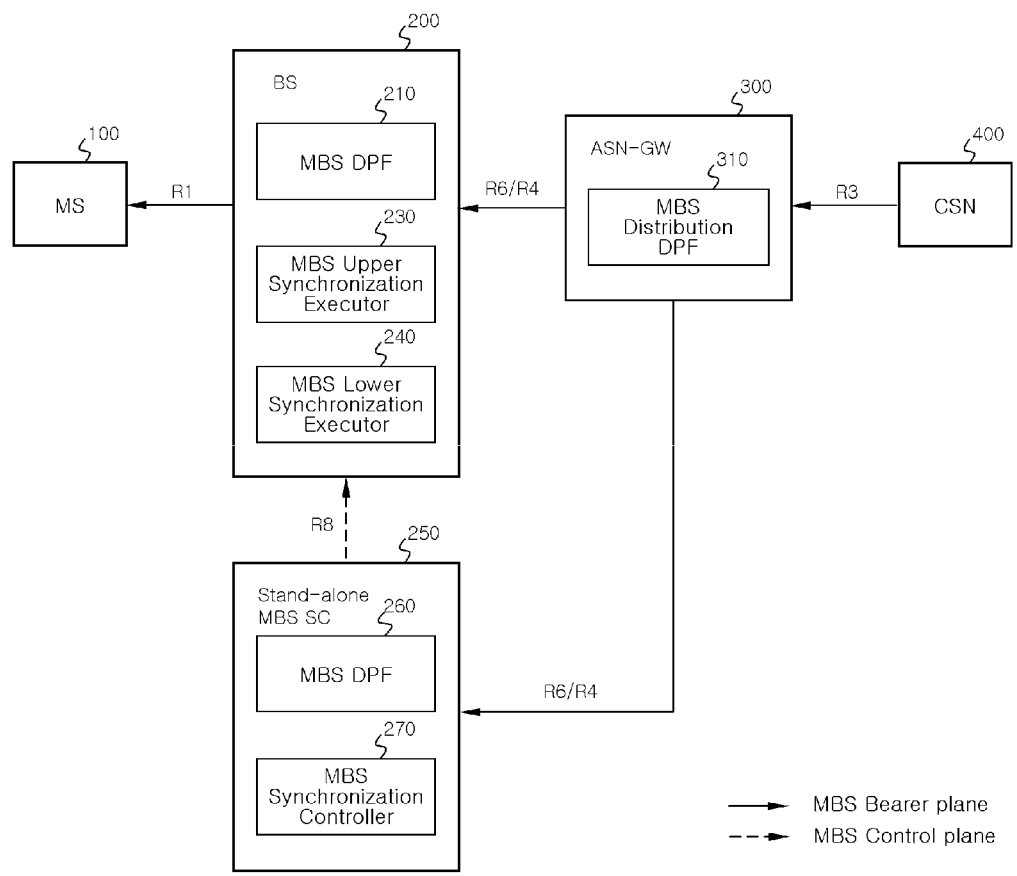
FIG. 4 is a diagram illustrating a structure of an MCBCS system according to a fourth embodiment of the present invention.

FIG. 4 is a diagram illustrating a structure of an MCBCS system according to a fourth embodiment of the present invention.

Referring to FIG. 4, the MCBCS system according to the present invention includes an MS 100, a BS 200, a Stand-alone MBS SC 250, an ASN-GW 300, a CSN 400, etc. Herein, the BS 200 includes an MBS DPF 210, an MBS Upper Synchronization Executor 230, and an MBS Lower Synchronization Executor 240. The Stand-alone MBS SC 250 includes an MBS DPF 260 and an MBS Synchronization Controller 270. The ASN-GW 300 includes an MBS Distribution DPF 310. Then, although not seen in FIG. 4, the CSN 400 can include an MCBCS Server/Controller, a Subscriber Profile Database, an AAA, etc.

Hereinafter, with reference to FIGS. 1 to 4, each element of the MCBCS system according to the present invention will now be described.

The MCBCS Server/Controller controls MCBCS components in CSN (Connectivity Service Network) by performing IP multicast group management, MCBCS program management, MCBCS announcement management including MCBCS guide manipulation and distribution, MCBCS session management, data encryption support, application layer key management, security association below application layer (e.g., SRTP, IPSec), transmission of mapping information (e.g., information for mapping IP address of MCBCS contents onto MCID allocated to MBS zone, information for mapping MBS zone ID onto MCBCS transmission zone), etc. The AAA is responsible for MCBCS authentications, authorizations, and accounting. The Subscriber Profile Database stores and manages subscriber profiles.

The MBS Distribution DPF (MBS Distribution Data Path Function) is a bearer plane entity in MBS Zone for NAP and is responsible for MBS bearer control management and MBS data distribution. Specifically, the MBS Distribution DPF performs MCBCS bearer control management including the DP (Data Path) establishment, maintenance, and release, MCBCS bearer traffic classification and delivery, GRE (Generic Routing Encapsulation) key and SN (Sequencing Number) management and distribution, MCBCS accounting support, etc. and transmits GRE SN, MBS data packet size information to the MBS Synchronization Controller.

Meanwhile, the MBS Distribution DPF is classified into Primary MBS Distribution DPF and Serving MBS Distribution DPF. The Primary MBS Distribution DPF is unique per MBS zone. If the Primary MBS Distribution DPF receives session start trigger from an MBS Proxy, the Primary MBS Distribution DPF acts as IGMP (Internet Group Management Protocol) client to send IGMP report message to the last MR (Multicast Router)between ASN and CSN to join IP multicast group tree between ASN and CSN. Also, the Primary MBS Distribution DPF transmits GRE SN, MBS data packet size information to the MBS Synchronization Controller. The Serving MBS Distribution DPF forwards IP multicast packet. For reference, IP forwarding is performed by unicasting or multicasting in ASN.

The MBS DPF receives MBS data packets from the MBS Distribution DPF, packages MBS data packets into MBS burst, and transmits the MBS burst to the MS.

The MBS Synchronization Controller is a control entity to generate synchronization rule including timestamp that supports macro diversity or downlink frame level coordination, in cooperation with the MBS Distribution DPF. The MBS Synchronization Controller transmits synchronization rule including timestamp to the MBS Synchronization Executor. For reference, one MBS Synchronization Controller exists in one MBS zone. The ASN-GW necessarily includes the MBS Synchronization Controller, and the BS in MBS zone can optionally include the MBS Synchronization Controller.

The MBS Synchronization Executor executes MBS synchronization rule from the MBS Synchronization Controller to synchronize data. According to a desirable embodiment of the present invention, the MBS Synchronization Executor can be separately implemented as MBS Upper Synchronization Executor and MBS Lower Synchronization Executor. In this case, the MBS Upper Synchronization Executor constructs MAC PDU depending on synchronization rule from the MBS Synchronization Controller and packages MAC PDU into MAC burst. The MBS Lower Synchronization Executor constructs the last PHY burst depending on synchronization rule from the MBS Synchronization Controller. Also, the MBS Lower Synchronization Executor constructs the last MBS sub-frame and transmits it to the MS. Then, the MBS Lower Synchronization Executor transmits mapping information that matches MCID with MBS zone ID, and broadcasts MCID, MBS zone ID, MBS_MAP_IE, MBS_MAP, and MBS_DATA_IE.

Meanwhile, the following Table 1 describes functions of WiMAX NRM reference points related to the MCBCS system according to the present invention (See FIG. 1).

TABLE 1

| WiMAX NRM reference points | |
|---|---|
| Reference point | Functions |
| R1 | IEEE 802.16e support |
| R2 | Subscription support |
| | Service Guide Distribution |
| | Key delivery |
| | Notification support |
| | Reception Report support |
| R3 | Notification on session start |
| | Bearer establishment/release |
| | Multicast support |
| | QoS management |
| R4/R6 | Bearer establishment/release |
| | Multicast support |
| | Synchronization information and data transmission |

Hereinafter, with reference to FIGS. 5 to 9, MCBCS method according to the present invention will now be described.

Figure 5:
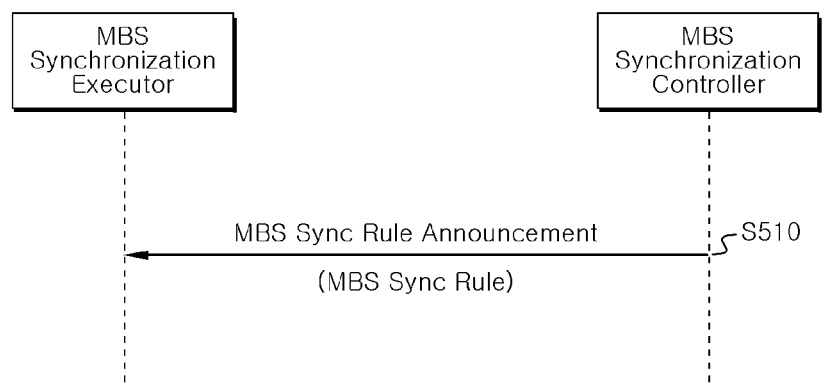
FIG. 5 is a diagram illustrating an MBS Synchronization Rule transmission according to a first embodiment of the present invention.

FIG. 5 is a diagram illustrating an MBS synchronization rule transmission according to a first embodiment of the present invention.

Once service infrastructure for the MBS Service Flow is activated, the MBS Synchronization Controller starts to announce MBS synchronization rule by sending MBS Synchronization Rule Announcement message (See Step S510).

In this case, if unicast infrastructure is used, the MBS Synchronization Controller sends MBS Synchronization Rule Announcement message directly to the unicast IP address of the corresponding MBS Synchronization Executor. If multicast infrastructure is used, the MBS Synchronization Controller sends MBS Synchronization Rule Announcement message to the multicast IP address allocated for synchronization rule distribution in the particular MBS Zone.

Meanwhile, depending on the implementation, some parameters in the synchronization rule may be preconfigured in the MBS Synchronization Executor.

Figure 6:
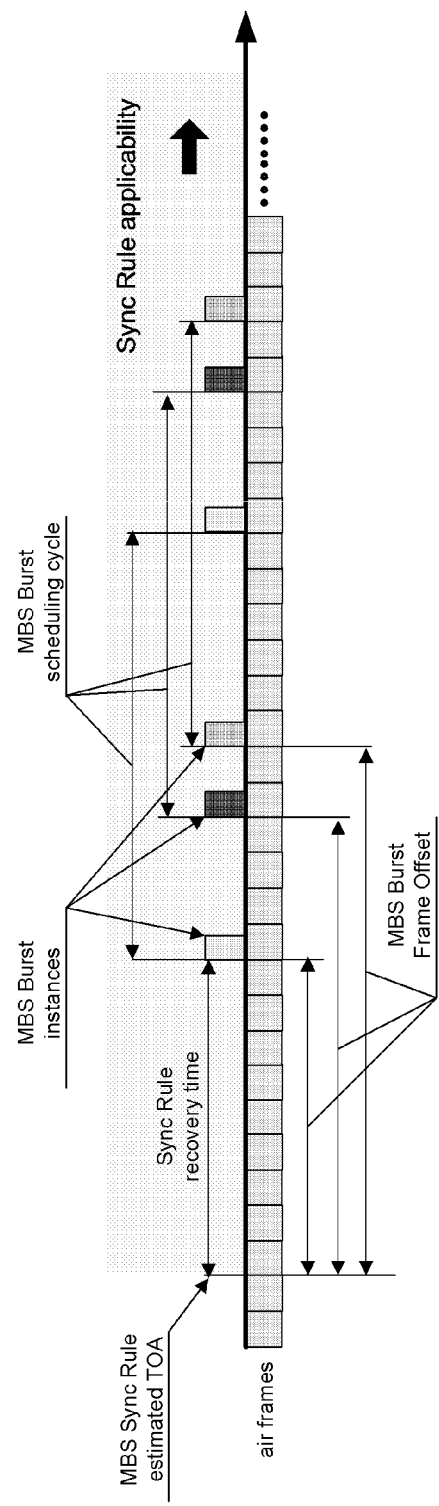
FIG. 6 is a diagram illustrating an MBS Synchronization Rule execution time and an MBS burst scheduling according to a first embodiment of the present invention.

FIG. 6 is a diagram illustrating an MBS synchronization rule execution time and an MBS burst scheduling according to a first embodiment of the present invention.

The expected time of arrival for the next MBS Synchronization Rule is indicated by 'Next Synchronization Rule expected TOA TLV' in the previous MBS Synchronization Rule Announcement message. The MBS burst is transmitted in the air frame indicated by the MBS Burst Offset TLV relative to MBS Synchronization Rule expected TOA (time of arrival).

The time interval between the Synchronization Rule expected TOA (time of arrival) and transmission time of the first MBS burst described in the Synchronization Rule should be long enough to allow Synchronization Rule message recovery if it is lost.

For reference, the particular MBS burst may be set into repetitive scheduling by defining the periodicity interval. Multiple MBS burst instances may be defined in the same MBS Synchronization Rule. Meanwhile, MBS Synchronization Rule may include parameters for one or more MBS burst transmissions.

MBS burst size and position are defined in MBS MAP IE, for example, via OFDMA Subchannel Offset TLV, OFDMA Symbol Offset TLV, Number of OFDMA Subchannels TLV, Number of OFDMA Symbols TLV, etc.

If these TLVs are missing, then no macro diversity is required in the MBS Zone. In this case, for example, 'macro diversity enhanced field' in the MBS MAP IE should be set to 0.

Data buffers in the MBS DPF/MBS Synchronization Executor are indexed by either MBS Zone ID/MCID pair or R6 data path Tunnel ID.

If the value of TLV remains same in the consecutive MBS Synchronization Rule message, the MBS Synchronization Controller may exclude these TLVs in the following MBS Synchronization Rule message except the TLVs identifying the Synchronization Rule. These TLVs identifying the Synchronization Rule shall be included in every MBS Synchronization Rule message. The parameters that identify the Synchronization Rule are Synchronization Rule GPS Timestamp and MBS Zone ID.

For reference, the following Table 2 describes MBS Synchronization Rule Announcement message format that is transmitted from the MBS Synchronization Controller to the MBS Synchronization Executor.

TABLE 2

| MBS Synchronization Rule Announcement message format | | | |
|---|---|---|---|
| IE | Reference | M/O | Notes |
| Sync Rule GPS Timestamp | | M | 32 bit GPS timestamp value identifying Sync Rule. The same value as used in the previous Sync Rule pointer (Next Sync Rule TOA TLV of the previous Sync Rule) SHALL be used. |
| Next Sync Rule expected TOA | | O | GPS timestamp corresponding the expected Time of Arrival for the next Sync Rule. Used for Sync Rule recovery mechanism. If missing, there is no recovery mechanism. |
| MBS zone Identifier | | M | See IEEE802.16e for further details. MBS Zone ID = 0 shall not be used. |
| MBS Burst | | O | Each instance of this compound TLV describes MBS Burst. Zero or more instances of this TLV may be included in the message. If no MBS Burst TLVs are included in the message, then previous MBS Sync Rule is valid. |
| > MBS Burst Frame offset | | CM | 16 bit value, specify the MBS Burst Frame Offset from the time specified in the UTC Timestamp TLV. |
| > Next MBS Burst Frame offset | | O | Should be specified for the last MBS Burst in the sync rule (or when just one MBS Burst is included in the sync rule). |
| > MBS Burst Scheduling Cycle | | O | 16-bit value. If included, defines the periodicity of MBS burst scheduling (in air frames). |
| > MBS_ Data_Info | | CM | MBS data packet information to be applied by the sync rule Multiple instances of this IE may be included for Type 1 data path. The order in which these IEs are included in the MBS Burst instance define the order of MAC PDUs for the corresponding MBS Service Flows in the Burst. For Type 3 data path, only 1 instance shall be included. |
| >> MCID | | M | See IEEE802.16e for further details. MCID is 12 bits over the R1 interface. Indicates the MCID which corresponds the MBS Service Flow for the particular MBS Zone ID. Valid only in the boundaries of this MBS Zone. May indicate the Data Buffer for Type 1 Data Path. For Type 3 Data Path, multiple instances of this IE may be included to indicate the MCIDs referred in the Burst. |

TABLE 2-continued

MBS Synchronization Rule Announcement message format

| IE | Reference | M/O | Notes |
|---|---|---|---|
| >> MBS MAC Burst SN | TBD | O | Shall be included for Type 3 data path (specific for Type 3 data path). Indicates the sequence number of the packet (GRE SN for GRE tunnel) representing the MBS MAC Burst to be used it the MBS Burst instance. |
| >> GRE sequence number start | | O | The GRE sequence number of the first MBS data packet (SDU) in the particular Data Buffer to be applied by the sync rule for the particular MBS Burst instance. This IE is specific for Type 1 Data Path. |
| >> GRE sequence number end | | O | The GRE sequence number of the last MBS data packet to be applied by the sync rule. Specific for Option 1 scheduling rule. This IE is specific for Type 1 Data Path. |
| >> MAX MAC PDU Size | | O | MAC PDU size that may be used to define fragmentation/packing rule for SDUs. May be included for Type 1 Data Path. |
| >> MBS SDU packet size | | O | One or more MBS data packet size in the order of GRE sequence number If there is a MBS data packet loss, BS can use this TLV to assign the air resource for Macro-diversity.. May be included for Type 1 Data Path. |
| >> Data Chunk Size | TBD | O | May be included for Type 1 Data Path. Indicates the number of bytes to be taken from the specified Data Buffer (MBS Service Flow/MCID). Specific for Option 3 scheduling rule. |
| >> Data Buffer Ratio | TBD | O | May be included for Type 1 Data Path. Defines the ratio weight for the particular Data Buffer (when using Option 2 scheduling rule). |
| > MBS_DATA_IE_context | | O | If Macro diversity is supported, this TLV is mandatory. MBS_DATA_IE context defined in IEEE802.16e. |
| >> MBS Burst Frame Offset | | CM | See IEEE802.16e for further details. |
| >> Next MBS MAP change indication | | CM | See IEEE802.16e for further details. |
| >> Next MBS No. OFDMA Symbols | | O | If the Next MBS MAP change indication is 1, this TLV is included. See IEEE802.16e for further details. |
| >> Next MBS No. OFDMA Subchannels | | O | If the Next MBS MAP change indication is 1, this TLV is included. See IEEE802.16e for further details. |
| >> MBS DIUC | | CM | See IEEE802.16e for further details. |
| >> OFDMA symbol offsets | | CM | See IEEE802.16e for further details. |
| >> subchannel offset | | CM | See IEEE802.16e for further details. |
| >> Boosting | | CM | See IEEE802.16e for further details. |
| >> No. OFDMA Symbols | | CM | See IEEE802.16e for further details. |
| >> No. Subchannels | | CM | See IEEE802.16e for further details. |
| >> Repetition Coding indication | | CM | See IEEE802.16e for further details. |
| >> Next MBS frame offset | | CM | See IEEE802.16e for further details. |
| >> Next MBS OFDMA symbol offset | | CM | See IEEE802.16e for further details. |
| MBS_MAP_IE_Context | | M | See IEEE802.16e for further details. |
| > Macro diversity enhanced | | M | 0: Non Macro-Diversity enhanced zone 1: Macro-Diversity enhanced zone See IEEE802.16e for further details. |
| > OFDMA symbol offset | | M | See IEEE802.16e for further details. |
| > subchannel offset | | CM | If the macro diversity enhanced is 0, this TLV is included. |
| > Permutation | | CM | If the Macro diversity enhanced is 1, this TLV is included. This TLV is for MBS permutation zone. See IEEE802.16e for further details. |
| > DL_PermBase | | CM | If the Macro diversity enhanced is 1, this TLV is included. This TLV is for MBS permutation zone. See IEEE802.16e for further details. |

TABLE 2-continued

MBS Synchronization Rule Announcement message format

| IE | Reference | M/O | Notes |
|---|---|---|---|
| > PRBS_ID | | CM | If the Macro diversity enhanced is 1, this TLV shall be included. This TLV is for MBS permutation zone. See IEEE802.16e for further details. |
| > MBS MAP message allocation included indication | | CM | Used to indicate if the MBS MAP message allocation parameters are included. When the macro diversity enhanced is 1, this TLV shall b be included, otherwise this TLV shall not be included See IEEE802.16e for further details. |
| > Boosting | | CM | If the macro diversity enhanced is 0, or the macro diversity enhanced is 1 and MBS MAP message allocation included indication is 1, then this TLV shall be included. Otherwise, this TLV shall not be included. See IEEE802.16e for further details. |
| > DIUC | | CM | If the macro diversity enhanced is 0, or the macro diversity enhanced is 1 and MBS MAP message allocation included indication is 1, then this TLV shall be included. Otherwise, this TLV shall not be included. See IEEE802.16e for further details. |
| > Repetition Coding indication | | CM | If the macro diversity enhanced is 0, or the macro diversity enhanced is 1 and MBS MAP message allocation included indication is 1, then this TLV shall be included. Otherwise, this TLV shall not be included. See IEEE802.16e for further details. |
| > No. Subchannels | | M | Indication of burst size of MBS MAP message with the number of subchannels See IEEE802.16e for further details |
| > No. OFDMA symbols | | M | Indication of burst size of MBS MAP message with the number of OFDMA symbols. |
| > Downlink Burst Profile | | M | See IEEE802.16e for further details. |
| BS Info | | O | |
| > BS ID | | O | |

Figure 7:
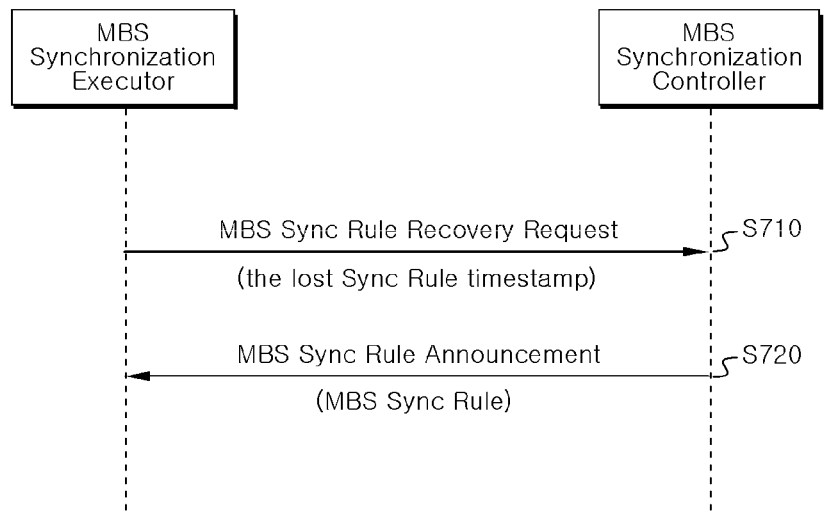
FIG. 7 is a diagram illustrating an MBS Synchronization Rule Recovery according to a first embodiment of the present invention.

FIG. 7 is a diagram illustrating an MBS Synchronization Rule recovery according to a first embodiment of the present invention.

As mentioned above, the MBS Synchronization Executor can identify the time of arrival of the next MBS Synchronization Rule by using the next Synchronization Rule expected time of arrival information (e.g., Next Synchronization Rule expected TOA TLV) in the current MBS Synchronization Rule.

MBS Synchronization Executor estimates the next MBS Synchronization Rule expected time of arrival through a Timer. If the MBS Synchronization Executor has not received the next Synchronization Rule by the expected arrival time, the MBS Synchronization Executor considers that the MBS Synchronization Rule is lost and then sends MBS Synchronization Rule Recovery Request message to the MBS Synchronization Controller (See Step S710). In this case, the MBS Synchronization Rule Recovery Request message includes the Synchronization Rule GPS Timestamp referring the missing MBS Synchronization Rule.

Then, the MBS Synchronization Controller finds the MBS Synchronization Rule requested by the MBS Synchronization Executor depending on the Synchronization Rule GPS Timestamp, and retransmits the MBS Synchronization Rule Announcement message including the requested Synchronization Rule to the MBS Synchronization Executor Controller (See Step S720).

For reference, the following Table 3 describes MBS Synchronization Rule Recovery Request message format that is transmitted from the MBS Synchronization Executor to the MBS Synchronization Controller.

TABLE 3

MBS Synchronization Rule Recovery Request message format

| IE | Reference | M/O | Notes |
|---|---|---|---|
| Sync Rule GPS Timestamp | | M | GPS Timestamp of the missing Sync Rule. |
| MBS zone Identifier | | M | See IEEE802.16e for further details. MBS Zone ID = 0 shall not be used. |
| BS Info | | M | |
| > BS ID | | M | |

Figure 8:
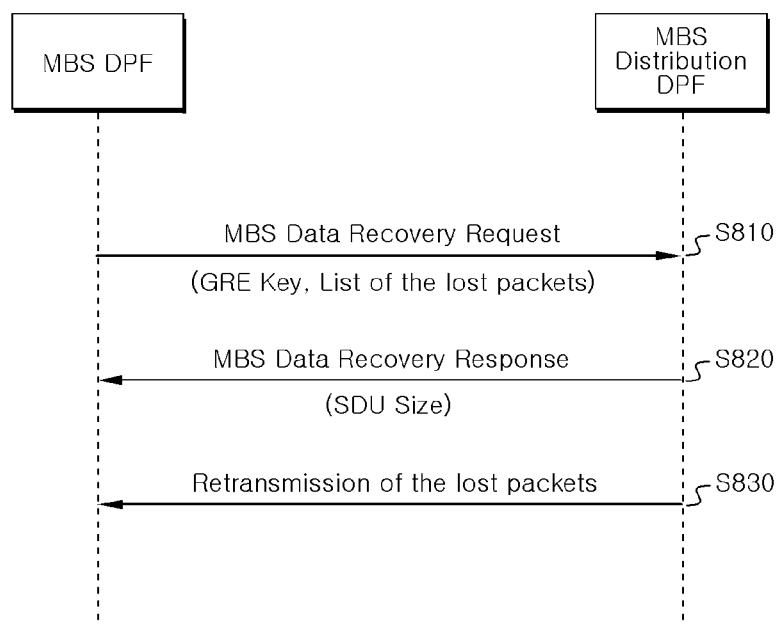
FIG. 8 is a diagram illustrating an MBS Data Recovery according to a first embodiment of the present invention.

FIG. 8 is a diagram illustrating an MBS Data Recovery according to a first embodiment of the present invention.

The MBS DPF detects SDU (Service Data Unit) loss by considering GRE SN of the packets received over the MBS Data Path. If the MBS DPF detects SDU loss, the MBS DPF triggers Data Recovery procedure by sending MBS Data Recovery Request message to the MBS Distribution DPF (See Step S810). For reference, the Data Recovery mechanism may be negotiated during MBS Data Path establishment.

Then, the MBS Distribution DPF transmits MBS Data Recovery Response message indicating the size of the lost SDU to the MBS DPF (See Step S820). For reference, Step S820 can be omitted and then negotiated during MBS Data Path establishment.

The MBS Distribution DPF resends the missing packet identified by GRE SN to the MBS DPF (See Step S830).

For reference, the following Table 4 describes MBS Data Recovery Request message format, and the following Table 5 describes MBS Data Recovery Response message format.

TABLE 4

MBS Data Recovery Request message format

| IE | Reference | M/O | Notes |
|---|---|---|---|
| BS Info | | M | |
| > BSID | | M | |
| MBS Info | | M | |
| > SF Info | TBD | M | |
| >> PDF ID | TBD | O | Identifies the MBS Service Flow for which SDU recovery is requested (for Type 1 data path). Either MBS Service ID or Data Path nfo with Data Path ID shall be included. |
| >> Transmission Zone ID | | O | |
| >> Data Path Info | | M | |
| >>> Data Path ID | | M | For GRE tunnel represents GRE Key. Identifies the data path for which SDU recovery is requested (for Type 1 data path). |
| >>> Requested packet | | M | Data structure for the requested packet on the data path. Multiple instances of this IE may be included. |
| >>>> Packet SN | | M | GRE Sequence Number of the missing packet. |

TABLE 5

MBS Data Recovery Response message format

| IE | Reference | M/O | Notes |
|---|---|---|---|
| BS Info | | M | |
| MBS Info | | | |
| > SF Info | TBD | M | |
| >> Data Path Info | | M | |
| >>> Data Path ID | | M | For GRE tunnel represents GRE Key. Identifies the data path for which SDU recovery is requested (for Type 1 data path). |
| >>> Requested packet | | M | Data structure for the requested packet on the data path. Multiple instances of this IE may be included |
| >>>> Packet SN | | M | GRE Sequence Number of the packet on the data path. |
| >>>> Packet Size | | M | The Size of the missing SDU. |

Meanwhile, according to an embodiment of the present invention, two Timers are used for Synchronization Rule transmission and recovery.

The first Timer ($T_{MBS\_Sync\_Rule\_Recovery\_Request}$) is started by the MBS Synchronization Executor when it sends the MBS Synchronization Rule Recovery Request message, and is stopped upon receiving a corresponding MBS Synchronization Rule Announcement message from the MBS Synchronization Controller.

The second Timer ($T_{MBS\_Data\_Recovery\_Request}$) is started by the MBS DPF when it sends the MBS Data Recovery Request message and is stopped upon receiving a corresponding MBS Data Recovery Response message or the lost packet from the MBS Distribution DPF.

Maximum Timer Values of the first and second Timers are respectively predetermined as proper values. If the Timer reaches the Maximum Timer Value, the Timer is reset and Recovery Request message is repeatedly transmitted. Then, repeated transmissions of Recovery Request message reach the maximum number of retry, the MBS Synchronization Executor and the MBS DPF perform the following actions.

If the first Timer reaches the maximum number of retry, the MBS Synchronization Executor discards the received MBS data until the next MBS Synchronization Rule is received successfully.

If the second Timer reaches the maximum number of retry, the MBS DPF discards the entire MBS data for the MBS frame or assigns the air resource using the MBS SDU packet size in the received MBS Synchronization Rule Announcement message for the lost packet and transmits the MBS frame.

For reference, the following Table 6 describes Message definitions in the first embodiment, and the following Table 7 describes TLV definitions in the first embodiment.

TABLE 6

Message definitions in the first embodiment

| Function Type | Message Type | Top Level TLVs | |
|---|---|---|---|
| | | TLV Name | M/O |
| MBS Sync Rule Announcement | | | |
| X | X | Sync Rule GPS Timestamp | M |
| | | Next Sync Rule expected TOA | O |
| | | MBS zone Identifier | M |
| | | MBS Burst | O |
| | | MBS_MAP_Context | M |
| | | BS Info | O |
| MBS Sync Rule Recovery Request | | | |
| X | X | Sync Rule GPS Timestamp | M |
| | | MBS zone Identifier | M |
| | | BS Info | M |
| MBS_Data_Recovery_Request | | | |
| X | X | BS Info | M |
| | | MBS Info | M |
| MBS_Data_Recovery_Response | | | |
| X | X | BS Info | M |
| | | MBS Info | M |

TABLE 7

TLV definitions in the first embodiment

MBS zone Identifier

| | |
|---|---|
| Type | xxx |
| Length in octets | 1 |
| Value | 8-bit unsigned integer. |
| Description | This parameter indicates a MBS zone through which the connection or virtual connection for the associated service flow is valid. |
| Parent TLV | None, MCBCS Service Info |

MCID

| | |
|---|---|
| Type | xxx |
| Length in octets | 2 |
| Value | 16-bit unsigned integer. |
| Description | This parameter indicates Multicast CID |
| Parent TLV | MBS_Data_Info |

TABLE 7-continued

TLV definitions in the first embodiment

Sync Rule GPS timestamp

| | |
|---|---|
| Type | xxx |
| Length in octets | 4 |
| Value | 32-bit unsigned integer. |
| Description | This indicates GPS timestamp value identifying a sync rule. |
| Parent TLV | None |

Next Sync Rule expected TOA

| | |
|---|---|
| Type | xxx |
| Length in octets | 4 |
| Value | 32-bit unsigned integer. |
| Description | This indicates GPS timestamp matched by the expected Time of Arrival for the next Sync Rule. This is used for Sync Rule recovery mechanism. |
| Parent TLV | None |

MBS Burst

| | | |
|---|---|---|
| Type | xxx | |
| Length in octets | Variable | |
| Value | Compound | |
| Description | MBS data description | |
| | TLV Name | M/O |
| Elements (Sub-TLVs) | MBS Burst Frame offset | CM |
| | Next MBS Burst Frame offset | O |
| | MBS Burst Scheduling Cycle | O |
| | MBS_Data_Info | CM |
| | MBS_Data_IE_context | O |
| Message Primitives That Use This TLV | MBS_Sync_Rule_Announcement | |

Next MBS Burst Frame offset

| | |
|---|---|
| Type | xxx |
| Length in octets | 1 |
| Value | 16-bit unsigned integer. |
| Description | This TLV should be specified for the last MBS Burst in the sync rule (or when just one MBS Burst is included in the sync rule) |
| Parent TLV | MBS Burst |

MBS Burst Scheduling Cycle

| | |
|---|---|
| Type | xxx |
| Length in octets | 1 |
| Value | 16-bit unsigned integer. |
| Description | This TLV defines the periodicity of MBS burst scheduling (in air frames). |
| Parent TLV | MBS Burst |

MAX MAC PDU Size

| | |
|---|---|
| Type | xxx |
| Length in octets | 2 |
| Value | 16-bit unsigned integer. |
| Description | This TLV is used to define a fragmentation and packing rule for SDUs. |
| Parent TLV | MBS_Data_Info |

MBS_Data_Info

| | | |
|---|---|---|
| Type | xxx | |
| Length in octets | Variable | |
| Value | Compound | |
| Description | MBS data description | |
| | TLV Name | M/O |
| Elements (Sub-TLVs) | GRE sequence number start | O |
| | GRE sequence number end | O |
| | MCID | M |
| | MBS MAC Burst SN | O |
| | MAX MAC PDU Size | O |
| | MBS SDU Packet size | O |
| | Data Chunk Size | O |
| | Data Buffer Ratio | O |
| Parent TLV | MBS Burst | |

GRE sequence number start

| | |
|---|---|
| Type | xxx |
| Length in octets | 4 |
| Value | 32-bit unsigned integer. |
| Description | The GRE sequence number of the first MBS data packet to be applied by the sync rule |
| Parent TLV | MBS_Data_Info |

GRE sequence number end

| | |
|---|---|
| Type | xxx |
| Length in octets | 4 |
| Value | 32-bit unsigned integer. |
| Description | The GRE sequence number of the last MBS data packet to be applied by the sync rule |
| Parent TLV | MBS_Data_Info |

MBS SDU packet size

| | |
|---|---|
| Type | xxx |
| Length in octets | 2 |
| Value | Times |
| Description | Times |
| Parent TLV | Times |

Data Chunk Size

| | |
|---|---|
| Type | xxx |
| Length in octets | 2 |
| Value | |
| Description | This TLV indicates the number of bytes to be take from the specified data buffer (MBS service flow/MCID). This TLV may be included for Type 1 data path. |
| Parent TLV | MBS_Data_Info |

Data Buffer Ratio

| | |
|---|---|
| Type | xxx |
| Length in octets | 2 |
| Value | |
| Description | This TLV defines the ratio weight for the particular data buffer. This TLV can be included for Type 1 data path. |
| Parent TLV | MBS_Data_Info |

MBS_DATA_IE_Context

| | | |
|---|---|---|
| Type | xxx | |
| Length in octets | Variable | |
| Value | Compound | |
| Description | Describes the contexts for MBS_DATA_IE | |
| | TLV Name | M/O |
| Elements (Sub-TLVs) | MBS Burst Frame Offset | CM |
| | Next MBS MAP change indication | CM |
| | Next MBS No. OFDMA Symbols | O |
| | Next MBS No. OFDMA Subchannels | O |
| | MBS DIUC | CM |
| | OFDMA symbol offsets | CM |
| | subchannel offset | CM |
| | Boosting | CM |
| | No. OFDMA Symbols | CM |
| | No. Subchannels | CM |
| | Repetition Coding indication | CM |
| | Next MBS frame offset | CM |
| | Next MBS OFDMA symbol offset | CM |
| Parent TLV | MBS Burst | |

MBS_MAP_Context

| | | |
|---|---|---|
| Type | xxx | |
| Length in octets | Variable | |
| Value | Compound | |
| Description | Describes the contexts for MBS_MAP and MBS_MAP_IE | |
| | TLV Name | M/O |
| Elements (Sub-TLVs) | >Macro diversity enhanced | M |
| | >OFDMA symbol offset | M |
| | >subchannel offset | CM |
| | >Permutation | CM |
| | >DL_PermBase | CM |

TABLE 7-continued

TLV definitions in the first embodiment

| | | |
|---|---|---|
| | >PRBS_ID | CM |
| | >MBS MAP message allocation included indication | CM |
| | >Boosting | CM |
| | >DIUC | CM |
| | >Repetition Coding indication | CM |
| | >No. Subchannels | M |
| | >No. OFDMA symbols | M |
| | >Downlink Burst Profile | M |
| Message Primitives That Use This TLV | MBS Sync Rule Announcement | |

MBS Burst Frame Offset

| | |
|---|---|
| Type | xxx |
| Length in octets | 1 |
| Value | 2 bit |
| Description | 1) This indicates the burst located by this IE will be shown after MBS Burst Frame Offset + 2 frames. as defined in the IEEE802.16e. 2) This TLV specifies the OFDMA Frame Offset from the time specified in the Sync Rule GPS Timestamp TLV |
| Parent TLV | MBS_Data_IE_context, MBS Burst |

Next MBS MAP change indication

| | |
|---|---|
| Type | xxx |
| Length in octets | 1 |
| Value | 2 bit |
| Description | This indicates whether the size of MBS MAP message of next MBS frame for these Multicast CIDs included this IE will be different from the size of this MBS MAP message, as defined in the IEEE802.16e. |
| Parent TLV | MBS_Data_IE_context |

Next MBS No. OFDMA Symbols

| | |
|---|---|
| Type | Xxx |
| Length in octets | 1 |
| Value | 6 bit |
| Description | It is to indicate the size of MBS_MAP message in Next MBS portion, as defined in the IEEE802.16e. |
| Parent TLV | MBS_Data_IE_context |

Next MBS No. OFDMA Subchannels

| | |
|---|---|
| Type | xxx |
| Length in octets | 1 |
| Value | 6 bit |
| Description | It is to indicate the size of MBS_MAP message in Next MBS portion, as defined in the IEEE802.16e. |
| Parent TLV | MBS_Data_IE_context |

MBS DIUC

| | |
|---|---|
| Type | xxx |
| Length in octets | 1 |
| Value | 4 bit |
| Description | It is to indicate MBS DIUC, as defined in the IEEE802.16e. |
| Parent TLV | MBS_Data_IE_context |

OFDMA symbol offsets

| | |
|---|---|
| Type | xxx |
| Length in octets | 1 |
| Value | 8 bit |
| Description | It is to indicate OFDMA symbol offset with respect to start of next (MBS Burst Frame offset + 2)th frame, as defined in the IEEE802.16e. |
| Parent TLV | MBS_Data_IE_context |

Subchannel offset

| | |
|---|---|
| Type | xxx |
| Length in octets | 1 |
| Value | 6 bit |
| Description | It is to indicate OFDMA subchannel offset with respect to start of next (MBS Burst Frame offset + 2)th frame, as defined in the IEEE802.16e. |
| Parent TLV | MBS_Data_IE_context |

Boosting

| | |
|---|---|
| Type | xxx |
| Length in octets | 1 |
| Value | 3 bit |
| Description | It is to indicate boosting, as defined in the IEEE802.16e. |
| Parent TLV | MBS_Data_IE_context |

No. OFDMA Symbols

| | |
|---|---|
| Type | xxx |
| Length in octets | 1 |
| Value | 7 bit |
| Description | It is to indicate the size of MBS data, as defined in the IEEE802.16e. |
| Parent TLV | MBS_Data_IE_context |

No. OFDMA Subchannels

| | |
|---|---|
| Type | xxx |
| Length in octets | 1 |
| Value | 6 bit |
| Description | It is to indicate the size of MBS data, as defined in the IEEE802.16e. |
| Parent TLV | MBS_Data_IE_context |

No. Subchannels

| | |
|---|---|
| Type | Xxx |
| Length in octets | 1 |
| Value | 6 bit |
| Description | It is to indicate the size of MBS data, as defined in the IEEE802.16e. |
| Parent TLV | MBS_Data_IE_context |

Repetition Coding indication

| | |
|---|---|
| Type | Xxx |
| Length in octets | 1 |
| Value | 2 bit |
| Description | 0b00 - No repetition coding 0b01 - Repetition coding of 2 used 0b10 - Repetition coding of 4 used 0b11 - Repetition coding of 6 used Refer the definition in IEEE802.16e spec. |
| Parent TLV | MBS_Data_IE_context |

Next MBS Frame offset

| | |
|---|---|
| Type | xxx |
| Length in octets | 1 |
| Value | 8 bit |
| Description | It is to indicate the relative value from the current frame number in which the next MBS MAP message will be transmitted, as defined in the IEEE802.16e. |
| Parent TLV | MBS_Data_IE_context |

Next OFDMA Symbol offset

| | |
|---|---|
| Type | xxx |
| Length in octets | 1 |
| Value | 8 bit |
| Description | It is to indicate the offset of the OFDMA symbol in which the next MBS portion starts, measured in OFDMA symbols from the beginning of the DL frame in which the MBS_MAP is transmitted, as defined in the IEEE802.16e. |
| Parent TLV | MBS_Data_IE_context |

TABLE 7-continued

TLV definitions in the first embodiment

Macro Diversity enhanced

| | |
|---|---|
| Type | xxx |
| Length in octets | 1 |
| Value | 1 bit |
| Description | 0: Non Macro-Diversity enhanced zone<br>1: Macro-Diversity enhanced zone<br>Refer a definition in IEEE802.16e spec. |
| Parent TLV | MBS_MAP_Context |

OFDMA symbol offset

| | |
|---|---|
| Type | xxx |
| Length in octets | 1 |
| Value | 1 bit |
| Description | The offset of the first OFDMA symbol of the MBS region measured in OFDMA symbols from beginning of this DL frame as defined in the IEEE802.16e. |
| Parent TLV | MBS_MAP_Context |

Subchannel offset

| | |
|---|---|
| Type | xxx |
| Length in octets | 1 |
| Value | 6 bit |
| Description | The lowest index OFDMA subchannel used for carring the burst, starting from subchannel 0 as defined in the IEEE802.16e. |
| Parent TLV | MBS_MAP_Context |

Permutation

| | |
|---|---|
| Type | xxx |
| Length in octets | 1 |
| Value | 2 bit |
| Description | 0b00: PUSC permutation<br>0b01: FUSC permutation<br>0b10: Optional FUSC permutation<br>0b11: Adjacent subcarrier permutation<br>Refer the definition in IEEE 802.16e. |
| Parent TLV | MBS_MAP_Context |

DL_PermBase

| | |
|---|---|
| Type | xxx |
| Length in octets | 1 |
| Value | 5 bit |
| Description | Refer the definition in IEEE 802.16e. |
| Parent TLV | MBS_MAP_Context |

PRBS_ID

| | |
|---|---|
| Type | xxx |
| Length in octets | 1 |
| Value | 2 bit |
| Description | Refer the definition in IEEE 802.16e. |
| Parent TLV | MBS_MAP_Context |

MBS MAP message allocation included indication

| | |
|---|---|
| Type | xxx |
| Length in octets | 1 |
| Value | 1 bit |
| Description | It is to indicate if the MBS MAP message allocation parameters are included as defined in the IEEE802.16e. |
| Parent TLV | MBS_MAP_Context |

Boosting

| | |
|---|---|
| Type | xxx |
| Length in octets | 1 |
| Value | 3 bit |
| Description | Refer the definition in IEEE 802.16e. |
| Parent TLV | MBS_MAP_Context |

DIUC

| | |
|---|---|
| Type | xxx |
| Length in octets | 1 |
| Value | 4 bit |
| Description | Refer the definition in IEEE 802.16e. |
| Parent TLV | MBS_MAP_Context |

TABLE 7-continued

TLV definitions in the first embodiment

Downlink Burst Profile

| | |
|---|---|
| Type | xxx |
| Length in octets | 1 |
| Value | 4 bit |
| Description | It is to indicate a definition of MBS DIUC as defined in the IEEE802.16e. |
| Parent TLV | MBS_MAP_Context |

Figure 9:
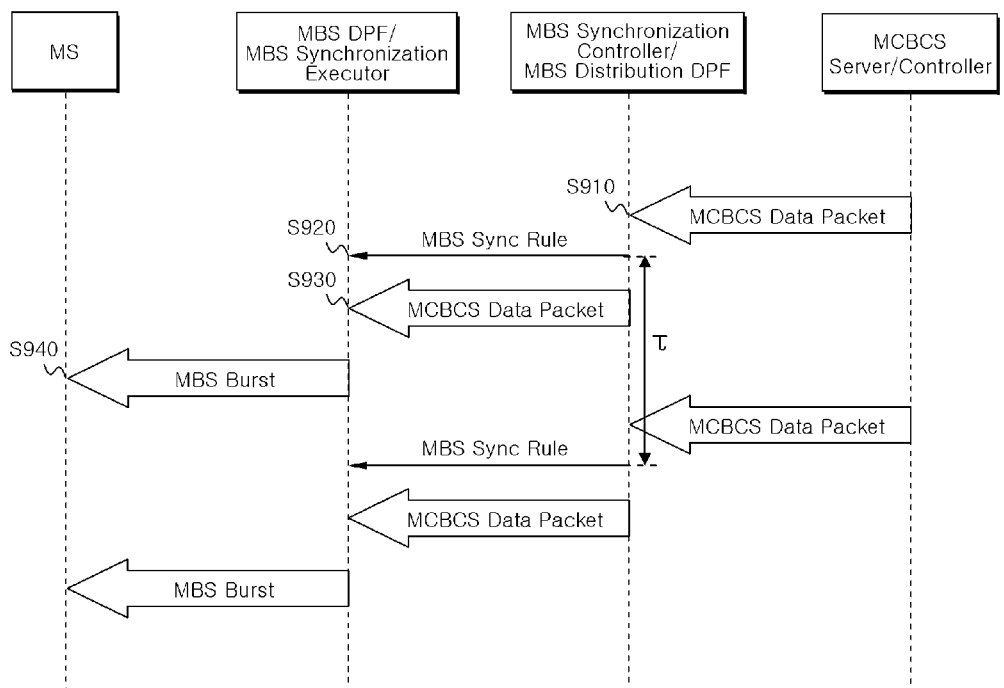
FIG. 9 is a diagram illustrating an MCBCS method using an MBS Synchronization Rule according to a second embodiment of the present invention.

FIG. 9 is a diagram illustrating an MBS Synchronization Rule transmission according to a second embodiment of the present invention.

The MBS DPF and the MBS Synchronization Executor are located in the BS. The MBS Distribution DPF and the MBS Synchronization Controller are located in the ASN-GW. In this embodiment, R6 Data Path between the ASN-GW and the BS uses Type 1 payload (as defined in [NWG rel.1]) and delivers row IP packets classified for the particular MBS Service Flow and tagged with the corresponding GRE SN by the MBS Distribution DPF.

Meanwhile, the complementary Synchronization Rules and control information are delivered to the BSs over R6 control plane from the ASN-GW. The MBS Synchronization Controller transmits the Synchronization Rule every τ to the MBS Synchronization Executor.

For reference, depending on the implementation, some parameters in the Synchronization Rules may be preconfigured in the MBS Synchronization Executor.

Referring to FIG. 9, the MCBCS Server/Controller transmits one or more MBS data packets to the ASN-GW over the R3 (See Step S910).

Then, the MBS Distribution DPF of the ASN-GW accumulates the MBS data packets during the pre-defined period [T0; T1]. The MBS Distribution DPF classifies the incoming MBS data packets into the appropriate MCBCS Service Flow and applies the corresponding WiMAX Convergence Sublayer rules (e.g. Packet Header Suppression). Then, the MBS Distribution DPF assigns GRE SN for each packet.

The MBS Synchronization Controller collects information such as GRE SN, MBS data packet size from the MBS Distribution DPF and constructs the MBS Synchronization Rule message which is applied to the MBS data to be sent by MBS Distribution DPF to the MBS Synchronization Executor (See Step S920). At this time, the MBS Synchronization Rule message includes all the Synchronization Rules for the bearer processing.

If the value of TLV remains same in the consecutive MBS Synchronization Rule message, the MBS Synchronization Controller may not include these TLVs in the following MBS Synchronization Rule message except the TLVs in the MBS_Info. The TLVs in the MBS_Info shall be included in every MBS Synchronization Rule message.

Thereafter, the MBS Distribution DPF delivers the accumulated MBS data packets during the pre-defined period [T0; T1] to the each MBS DPF in MBS zone (See Step S930).

Then, the MBS DPF provides the multicast and broadcast service by packaging the MBS data packets into the MBS burst and transmitting the MBS burst to the MSs.

For reference, the following Table 8 describes MBS Synchronization Rule message format that is transmitted from the MBS Synchronization Controller to the MBS Synchronization Executor.

TABLE 8

MBS Synchronization Rule message format

| IE | Reference | M/O | Notes |
|---|---|---|---|
| MBS_Info | | M | |
| > MBS zone Identifier | | M | See IEEE802.16e for further details. MBS Zone ID = 0 shall not be used. |
| > MCID (one or more) | | M | See IEEE802.16e for further details. MCID is 12 bits over the R1 interface. |
| Time_Sync_Info | | O | This TLV is to indicate the exact time when MBS data should be transmitted over the R1 interface. If Macro diversity is supported, this TLV is mandatory. |
| > UTC timestamp | | CM | 32 bit UTC timestamp value |
| > OFDMA Frame offset | | CM | 8 bit value, specify the OFDMA Frame Offset from the time specified in the UTC Timestamp TLV. |
| MBS_DATA_IE_context | | O | If Macro diversity is supported, this TLV is mandatory. MBS_DATA_IE context defined in IEEE802.16e. |
| > MBS Burst Frame Offset | | CM | See IEEE802.16e for further details. |
| > Next MBS MAP change indication | | CM | See IEEE802.16e for further details. |
| > Next MBS No. OFDMA Symbols | | O | If the Next MBS MAP change indication is 1, this TLV is included. See IEEE802.16e for further details. |
| > Next MBS No. OFDMA Subchannels | | O | If the Next MBS MAP change indication is 1, this TLV is included. See IEEE802.16e for further details. |
| > MBS DIUC | | CM | See IEEE802.16e for further details. |
| > OFDMA symbol offsets | | CM | See IEEE802.16e for further details. |
| > subchannel offset | | CM | See IEEE802.16e for further details. |
| > Boosting | | CM | See IEEE802.16e for further details. |
| > No. OFDMA Symbols | | CM | See IEEE802.16e for further details. |
| > No. Subchannels | | CM | See IEEE802.16e for further details. |
| > Repetition Coding indication | | CM | See IEEE802.16e for further details. |
| > Next MBS frame offset | | CM | See IEEE802.16e for further details. |
| > Next MBS OFDMA symbol offset | | CM | See IEEE802.16e for further details. |
| MBS_MAP_Context | | M | See IEEE802.16e for further details. |
| > Macro diversity enhanced | | M | 0: Non Macro-Diversity enhanced zone 1: Macro-Diversity enhanced zone See IEEE802.16e for further details. |
| > OFDMA symbol offset | | M | See IEEE802.16e for further details. |
| > subchannel offset | | CM | If the macro diversity enhanced is 0, this TLV is included. |
| > Permutation | | CM | If the Macro diversity enhanced is 1, this TLV is included. This TLV is for MBS permutation zone. See IEEE802.16e for further details. |
| > DL_PermBase | | CM | If the Macro diversity enhanced is 1, this TLV is included. This TLV is for MBS permutation zone. See IEEE802.16e for further details. |
| > PRBS_ID | | CM | If the Macro diversity enhanced is 1, this TLV shall be included. This TLV is for MBS permutation zone. See IEEE802.16e for further details. |
| > MBS MAP message allocation included indication | | CM | Used to indicate if the MBS MAP message allocation parameters are included. When the macro diversity enhanced is 1, this TLV shall b be included, otherwise this TLV shall not be included See IEEE802.16e for further details. |
| > Boosting | | CM | If the macro diversity enhanced is 0, or the macro diversity enhanced is 1 and MBS MAP message allocation included indication is 1, then this TLV shall be included. Otherwise, this TLV shall not be included. See IEEE802.16e for further details. |
| > DIUC | | CM | If the macro diversity enhanced is 0, or the macro diversity enhanced is 1 and MBS MAP message allocation included indication is 1, then this TLV shall be included. Otherwise, this TLV shall not be included. See IEEE802.16e for further details. |

TABLE 8-continued

MBS Synchronization Rule message format

| IE | Reference | M/O | Notes |
|---|---|---|---|
| > Repetition Coding indication | | CM | If the macro diversity enhanced is 0, or the macro diversity enhanced is 1 and MBS MAP message allocation included indication is 1, then this TLV shall be included. Otherwise, this TLV shall not be included. See IEEE802.16e for further details. |
| > No. Subchannels | | M | Indication of burst size of MBS MAP message with the number of subchannels See IEEE802.16e for further details |
| > No. OFDMA symbols | | M | Indication of burst size of MBS MAP message with the number of OFDMA symbols. |
| > Downlink Burst Profile | | M | See IEEE802.16e for further details. |
| MAC_context | | M | This TLV includes a rule to create a MAC PDU. |
| > MAC PDU Size | | M | MAC PDU size |
| MBS_Data_Info | | M | MBS data packet information to be applied by the sync rule |
| > GRE sequence number start | | M | The GRE sequence number of the first MBS data packet to be applied by the sync rule |
| > GRE sequence number end | | M | The GRE sequence number of the last MBS data packet to be applied by the sync rule |
| > MBS data packet size (one or more) | | O | This TLV is mandatory with macro-diversity. One or more MBS data packet size in the order of GRE sequence number If there is a MBS data packet loss, BS can use this TLV to assign the air resource for Macro-diversity.. |
| BS Info | | M | |
| > BS ID | | M | |

Meanwhile, the following Table 9 describes Message definitions in the second embodiment, and the following Table 10 describes TLV definitions in the second embodiment.

TABLE 9

Message definitions in the second embodiment
MBS Sync rule

| Function Type | Message Type | Top Level TLVs | |
|---|---|---|---|
| | | TLV Name | M/O |
| X | X | MBS_Info | M |
| | | Time_Sync_Info | O |
| | | MAC_Context | M |
| | | MBS_DATA_IE_context | O |
| | | MBS_MAP_Context | M |
| | | MBS_Data_Info | M |
| | | BS Info | M |

TABLE 10

TLV definitions in the second embodiment

MBS_Info

| Type | xxx | |
|---|---|---|
| Length in octets | Variable | |
| Value | Compound | |
| Description | Description of MBS | |
| | TLV Name | M/O |
| Elements (Sub-TLVs) | MBS zone Identifier | M |
| | MCID | M |
| | Multicast IP address | O |
| Message Primitives That Use This TLV | MBS_Sync_Rule | |

TABLE 10-continued

TLV definitions in the second embodiment

MBS zone Identifier

| Type | xxx |
|---|---|
| Length in octets | 1 |
| Value | 8-bit unsigned integer. |
| Description | This parameter indicates a MBS zone through which the connection or virtual connection for the associated service flow is valid. |
| Parent TLV | MBS_Info |

MCID

| Type | xxx |
|---|---|
| Length in octets | 2 |
| Value | 16-bit unsigned integer. |
| Description | This parameter indicates Multicast CID |
| Parent TLV | MBS_Info |

Time_sync_Info

| Type | xxx | |
|---|---|---|
| Length in octets | Variable | |
| Value | Compound | |
| Description | This TLV indicates the exact time when MBS data should be transmitted over the R1 interface. | |
| | TLV Name | M/O |
| Elements (Sub-TLVs) | UTC timestamp | M |
| | OFDMA frame offset | M |
| Message Primitives That Use This TLV | MBS_Sync_Rule | |

UTC timestamp

| Type | xxx |
|---|---|
| Length in octets | 4 |
| Value | 32-bit unsigned integer. |
| Description | This indicates UTC timestamp value |
| Parent TLV | Time_Sync_Info |

TABLE 10-continued

TLV definitions in the second embodiment

OFDMA frame offset

| | |
|---|---|
| Type | xxx |
| Length in octets | 1 |
| Value | 8-bit unsigned integer. |
| Description | This TLV specifies the OFDMA Frame Offset from the time specified in the UTC Timestamp TLV |
| Parent TLV | Time_Sync_Info |

MAC_Context

| | |
|---|---|
| Type | xxx |
| Length in octets | Variable |
| Value | Compound |
| Description | This TLV indicates the required information for a bearer processing in MAC layer. |

| TLV Name | M/O |
|---|---|
| Elements (Sub-TLVs) MAC PDU Size | M |
| MBS_Sync_Rule | |

Message Primitives That Use This TLV

MAC PDU Size

| | |
|---|---|
| Type | xxx |
| Length in octets | 2 |
| Value | 16-bit unsigned integer. |
| Description | This TLV specifies the size of MAC PDU. |
| Parent TLV | MAC_Context |

MBS_Data_Info

| | |
|---|---|
| Type | xxx |
| Length in octets | Variable |
| Value | Compound |
| Description | MBS data description |

| TLV Name | M/O |
|---|---|
| Elements (Sub-TLVs) GRE sequence number start | M |
| GRE sequence number end | M |
| List of MBS data packet size | O |

Message Primitives That Use This TLV: MBS_Sync_Rule

GRE sequence number start

| | |
|---|---|
| Type | xxx |
| Length in octets | 4 |
| Value | 32-bit unsigned integer. |
| Description | The GRE sequence number of the first MBS data packet to be applied by the sync rule |
| Parent TLV | MBS_Data_Info |

GRE sequence number end

| | |
|---|---|
| Type | xxx |
| Length in octets | 4 |
| Value | 32-bit unsigned integer. |
| Description | The GRE sequence number of the last MBS data packet to be applied by the sync rule |
| Parent TLV | MBS_Data_Info |

MBS data packet size

| | |
|---|---|
| Type | xxx |
| Length in octets | 2 |
| Value | |
| Description | MBS data packet size in the order of GRE sequence number |
| Parent TLV | MBS_Data_Info |

MBS_DATA_IE_Context

| | |
|---|---|
| Type | xxx |
| Length in octets | Variable |
| Value | Compound |
| Description | Describes the contexts for MBS_DATA_IE |

| TLV Name | M/O |
|---|---|
| Elements (Sub-TLVs) MBS Burst Frame Offset | CM |
| Next MBS MAP change indication | CM |
| Next MBS No. OFDMA Symbols | O |
| Next MBS No. OFDMA Subchannels | O |
| MBS DIUC | CM |
| OFDMA symbol offsets | CM |
| subchannel offset | CM |
| Boosting | CM |
| No. OFDMA Symbols | CM |
| No. Subchannels | CM |
| Repetition Coding indication | CM |
| Next MBS frame offset | CM |
| Next MBS OFDMA symbol offset | CM |

Message Primitives That Use This TLV: MBS_Sync_Rule

MBS_MAP_Context

| | |
|---|---|
| Type | xxx |
| Length in octets | Variable |
| Value | Compound |
| Description | Describes the contexts for MBS_MAP and MBS_MAP_IE |

| TLV Name | M/O |
|---|---|
| Elements (Sub-TLVs) > Macro diversity enhanced | M |
| > OFDMA symbol offset | M |
| > subchannel offset | CM |
| > Permutation | CM |
| > DL_PermBase | CM |
| > PRBS_ID | CM |
| > MBS MAP message allocation included indication | CM |
| > Boosting | CM |
| > DIUC | CM |
| > Repetition Coding indication | CM |
| > No. Subchannels | M |
| > No. OFDMA symbols | M |
| > Downlink Burst Profile | M |

Message Primitives That Use This TLV: MBS_Sync_Rule

MBS Burst Frame Offset

| | |
|---|---|
| Type | xxx |
| Length in octets | 1 |
| Value | 2 bit |
| Description | This indicates the burst located by this IE will be shown after MBS Burst Frame Offset +2 frames. as defined in the IEEE802.16e. |
| Parent TLV | MBS_Data_Info |

Next MBS MAP change indication

| | |
|---|---|
| Type | xxx |
| Length in octets | 1 |
| Value | 2 bit |
| Description | This indicates whether the size of MBS MAP message of next MBS frame for these Multicast CIDs included this IE will be different from the size of this MBS MAP message, as defined in the IEEE802.16e. |
| Parent TLV | MBS_Data_Info |

Next MBS No. OFDMA Symbols

| | |
|---|---|
| Type | xxx |
| Length in octets | 1 |
| Value | 6 bit |
| Description | It is to indicate the size of MBS_MAP message in Next MBS portion, as defined in the IEEE802.16e. |

Next MBS No. OFDMA Subchannels

| | |
|---|---|
| Type | xxx |
| Length in octets | 1 |
| Value | 6 bit |
| Description | It is to indicate the size of MBS_MAP message in Next MBS portion, as defined in the IEEE802.16e. |

MBS DIUC

| | |
|---|---|
| Type | xxx |
| Length in octets | 1 |
| Value | 4 bit |
| Description | It is to indicate MBS DIUC, as defined in the IEEE802.16e. |

TABLE 10-continued

TLV definitions in the second embodiment

OFDMA symbol offsets

| | |
|---|---|
| Type | xxx |
| Length in octets | 1 |
| Value | 8 bit |
| Description | It is to indicate OFDMA symbol offset with respect to start of next (MBS Burst Frame offset + 2)th frame, as defined in the IEEE802.16e. |

Subchannel offset

| | |
|---|---|
| Type | xxx |
| Length in octets | 1 |
| Value | 6 bit |
| Description | It is to indicate OFDMA subchannel offset with respect to start of next (MBS Burst Frame offset + 2)th frame, as defined in the IEEE802.16e. |

Boosting

| | |
|---|---|
| Type | xxx |
| Length in octets | 1 |
| Value | 3 bit |
| Description | It is to indicate boosting, as defined in the IEEE802.16e. |

No. OFDMA Symbols

| | |
|---|---|
| Type | xxx |
| Length in octets | 1 |
| Value | 7 bit |
| Description | It is to indicate the size of MBS data, as defined in the IEEE802.16e. |

No. OFDMA Subchannels

| | |
|---|---|
| Type | xxx |
| Length in octets | 1 |
| Value | 6 bit |
| Description | It is to indicate the size of MBS data, as defined in the IEEE802.16e. |

No. Subchannels

| | |
|---|---|
| Type | Xxx |
| Length in octets | 1 |
| Value | 6 bit |
| Description | It is to indicate the size of MBS data, as defined in the IEEE802.16e. |

Repetition Coding indication

| | |
|---|---|
| Type | Xxx |
| Length in octets | 1 |
| Value | 2 bit |
| Description | 0b00 - No repetition coding<br>0b01 - Repetition coding of 2 used<br>0b10 - Repetition coding of 4 used<br>0b11 - Repetition coding of 6 used<br>Refer the definition in IEEE 802.16e spec. |

Next MBS Frame offset

| | |
|---|---|
| Type | xxx |
| Length in octets | 1 |
| Value | 8 bit |
| Description | It is to indicate the relative value from the current frame number in which the next MBS MAP message will be transmitted, as defined in the IEEE802.16e. |

Next OFDMA Symbol offset

| | |
|---|---|
| Type | xxx |
| Length in octets | 1 |
| Value | 8 bit |
| Description | It is to indicate the offset of the OFDMA symbol in which the next MBS portion starts, measured in OFDMA symbols from the beginning of the DL frame in which the MBS_MAP is transmitted, as defined in the IEEE802.16e. |

Macro Diversity enhanced

| | |
|---|---|
| Type | xxx |
| Length in octets | 1 |
| Value | 1 bit |
| Description | 0: Non Macro-Diversity enhanced zone<br>1: Macro-Diversity enhanced zone<br>Refer a definition in IEEE802.16e spec. |

OFDMA symbol offset

| | |
|---|---|
| Type | xxx |
| Length in octets | 1 |
| Value | 1 bit |
| Description | The offset of the first OFDMA symbol of the MBS region measured in OFDMA symbols from beginning of this DL frame as defined in the IEEE802.16e. |

Subchannel offset

| | |
|---|---|
| Type | xxx |
| Length in octets | 1 |
| Value | 6 bit |
| Description | The lowest index OFDMA subchannel used for carring the burst, starting from subchannel 0 as defined in the IEEE802.16e. |

Permutation

| | |
|---|---|
| Type | xxx |
| Length in octets | 1 |
| Value | 2 bit |
| Description | 0b00: PUSC permutation<br>0b01: FUSC permutation<br>0b10: Optional FUSC permutation<br>0b11: Adjacent subcarrier permutation<br>Refer the definition in IEEE 802.16e. |

DL_PermBase

| | |
|---|---|
| Type | xxx |
| Length in octets | 1 |
| Value | 5 bit |
| Description | Refer the definition in IEEE 802.16e. |

PRBS_ID

| | |
|---|---|
| Type | xxx |
| Length in octets | 1 |
| Value | 2 bit |
| Description | Refer the definition in IEEE 802.16e. |

MBS MAP message allocation included indication

| | |
|---|---|
| Type | xxx |
| Length in octets | 1 |
| Value | 1 bit |
| Description | It is to indicate if the MBS MAP message allocation parameters are included as defined in the IEEE802.16e. |

Boosting

| | |
|---|---|
| Type | xxx |
| Length in octets | 1 |
| Value | 3 bit |
| Description | Refer the definition in IEEE 802.16e. |

DIUC

| | |
|---|---|
| Type | xxx |
| Length in octets | 1 |
| Value | 4 bit |
| Description | Refer the definition in IEEE 802.16e. |

Downlink Burst Profile

| | |
|---|---|
| Type | xxx |
| Length in octets | 1 |
| Value | 4 bit |
| Description | It is to indicate a definition of MBS DIUC as defined in the IEEE802.16e. |

While the invention has been shown and described with reference to a certain preferred embodiment thereof, it will be understood by those skilled in the art that various changes in form and details may be made therein without departing from the spirit and scope of the invention as defined by the appended claims.

The invention claimed is:

1. A multicast and broadcast service method, comprising:
   transmitting an MBS (multicast and broadcast service) Synchronization Rule to a BS (Base Station), by an ASN-GW (Access Service Network-Gateway);
   if the BS does not receive a next MBS Synchronization Rule until next MBS Synchronization Rule expected TOA (Time of Arrival) included in the MBS Synchronization Rule, transmitting a Recovery Request for a missing MBS Synchronization Rule to the ASN-GW, by the BS; and
   retransmitting the missing MBS Synchronization Rule to the BS, by the ASN-GW.

2. The method of claim 1, wherein the ASN-GW identifies the missing MBS Synchronization Rule by using Synchronization Rule GPS Timestamp included in the Recovery Request for the missing MBS Synchronization Rule.

3. The method of claim 1, further comprising:
   if the BS does not receive the missing MBS Synchronization Rule from the ASN-GW, retransmitting the Recovery Request for the missing MBS Synchronization Rule to the ASN-GW, by the BS, and if the number of retransmitting reaches the predetermined maximum number of retry, discarding the received MBS data until the next MBS Synchronization Rule is received successfully, by the BS.

4. The method of claim 1, wherein the ASN-GW includes an MBS Synchronization Controller that generates the MBS Synchronization Rule and transmits the MBS Synchronization Rule to the BS: and the BS includes an MBS Synchronization Executor that receives the MBS Synchronization Rule from the MBS Synchronization Controller and executes MBS synchronization according to the MBS Synchronization Rule.

5. The method of claim 1, wherein the MBS Synchronization Rule includes parameters for transmissions of one or more MBS bursts.

6. The method of claim 1, wherein if the value of at least one parameter does not changed in consecutive MBS Synchronization Rules, at least one parameter with the unchanged value is excluded in the following MBS Synchronization Rule.

7. A multicast and broadcast service method, comprising:
   transmitting an MBS (multicast and broadcast service) data and an MBS Synchronization Rule to a BS (Base Station), by an ASN-GW (Access Service Network-Gateway);
   detecting loss of the MBS data by referring a GRE (Generic Routing Encapsulation) SN (Sequence Number) included in the MBS Synchronization Rule, and if the loss of the MBS data is detected, transmitting a Recovery Request for a missing MBS data to the ASN-GW, by the BS; and
   retransmitting the missing MBS data to the BS, by the ASN-GW,
   wherein if the BS does not receive a next MBS Synchronization Rule until next MBS Synchronization Rule expected TOA (Time of Arrival) included in the MBS Synchronization Rule, the BS transmits a Recovery Request for a missing MBS Synchronization Rule to the ASN-GW; and the ASN-GW retransmits the missing MBS Synchronization Rule to the BS.

8. The method of claim 7, further comprising:
   if the BS does not receive the missing MBS data from the ASN-GW, retransmitting the Recovery Request for the missing MBS data to the ASN-GW, by the BS, and if the number of retransmitting reaches the predetermined maximum number of retry, discarding the received entire MBS data for an MBS frame, by the BS.

9. The method of claim 7, between the step of transmitting the Recovery Request and the step of retransmitting the missing MBS data, further comprising:
   informing a SDU (Service Data Unit) size to the BS in response to the Recovery Request for the missing MBS data, by the ASN-GW.

10. The method of claim 9, further comprising:
    if the BS does not receive the missing MBS data from the ASN-GW, retransmitting the Recovery Request for the missing MBS data to the ASN-GW, by the BS, and if the number of retransmitting reaches the predetermined maximum number of retry, allocating air resource by using the SDU size and transmitting the MBS frame, by the BS.

11. The method of claims 7, wherein the ASN-GW includes an MBS Distribution DPF (Data Patch Function) that receives the MBS data from an MCBCS (multicast and broadcast service) Server/Controller and distributes the MBS data; and the BS includes an MBS DPF that receives the MBS data from the MBS Distribution DPF and packages the MBS data into an MBS burst.

12. A multicast and broadcast service method, comprising:
    accumulating MBS data packets received from an MCBCS (multicast and broadcast service) Server/Controller during a predetermined period, by an ASN-GW (Access Service Network-Gateway);
    generating an MBS Synchronization Rule by allocating GRE (Generic Routing Encapsulation) SN (Sequence Number) for the MBS data packets and transmitting the MBS Synchronization Rule to a BS (Base Station), by the ASN-GW;
    if the BS does not receive a next MBS Synchronization Rule until next MBS Synchronization Rule expected TOA (Time of Arrival) included in the MBS Synchronization Rule, transmitting a Recovery Request for a missing MBS Synchronization Rule to the ASN-GW, by the BS;
    retransmitting the missing MBS Synchronization Rule to the BS, by the ASN-GW;
    if the BS receives the MBS Synchronization Rule successfully, transmitting the MBS data packets accumulated during the predetermined period to the BS, by the ASN-GW; and
    packaging the MBS data packets into an MBS burst by referring the GRE SN included in the MBS Synchronization Rule and transmitting the MBS burst to an MS (Mobile Station), by the BS.

13. The method of claim 12, wherein the ASN-GW identifies the missing MBS Synchronization Rule by using Synchronization Rule GPS Timestamp included in the Recovery Request for the missing MBS Synchronization Rule.

14. The method of claim 12, prior to the step of transmitting the MBS burst to the MS, further comprising:
    detecting loss of the MBS data by referring a GRE (Generic Routing Encapsulation) SN (Sequence Number) included in the MBS Synchronization Rule, and if the loss of the MBS data is detected, transmitting a Recovery Request for a missing MBS data to the ASN-GW, by the BS; and
    retransmitting the missing MBS data to the BS, by the ASN-GW.

15. A multicast and broadcast service system, comprising:
    an MBS (multicast and broadcast service) Distribution DPF (Data Patch Function) for receiving and distributing MBS data;

an MBS Synchronization Controller for generating and transmitting an MBS Synchronization Rule that includes GRE (Generic Routing Encapsulation) SN (Sequence Number) for the MBS data;

an MBS Synchronization Executor for receiving the MBS Synchronization Rule from the MBS Synchronization Controller and executing MBS synchronization according to the MBS Synchronization Rule; and an MBS DPF for receiving MBS data from the MBS Distribution DPF, packaging the MBS data into an MBS burst, and transmitting the MBS burst to an MS (Mobile Station), wherein if the MBS Synchronization Executor does not receive a next MBS Synchronization Rule until next MBS Synchronization Rule expected TOA (Time of Arrival) included in the MBS Synchronization Rule, the MBS Synchronization Executor transmits a Recovery Request for a missing MBS Synchronization Rule to the MBS Synchronization Controller; and the MBS Synchronization Controller retransmits the missing MBS Synchronization Rule to the MBS Synchronization Executor.

16. The system of claim 15, wherein if the MBS Synchronization Executor does not receive the missing MBS Synchronization Rule from the MBS Synchronization Controller, the MBS Synchronization Executor retransmits the Recovery Request for the missing MBS Synchronization Rule to the MBS Synchronization Controller, and if the number of retransmitting reaches the predetermined maximum number of retry, the MBS Synchronization Executor discards the received MBS data until the next MBS Synchronization Rule is received successfully.

17. The system of claim 15, wherein the MBS DPF detects loss of the MBS data by referring a GRE (Generic Routing Encapsulation) SN (Sequence Number) included in the MBS Synchronization Rule, and if the loss of the MBS data is detected, transmits a Recovery Request for a missing MBS data to the MBS Distribution DPF; and the MBS Distribution DPF retransmits the missing MBS data to the MBS DPF.

18. The system of claim 15, wherein if the value of at least one parameter does not changed in consecutive MBS Synchronization Rules, the MBS Synchronization Controller excludes at least one parameter with the unchanged value is excluded in the following MBS Synchronization Rule.

19. The system of claim 15, wherein the MBS Distribution DPF and the MBS Synchronization Controller are located in an ASN-GW (Access Service Network-Gateway); and the MBS DPF and the MBS Synchronization Executor are located in a BS (Base Station).

20. A multicast and broadcast service system, comprising:
an MBS (multicast and broadcast service) Distribution DPF (Data Patch Function) for receiving MBS data packets, distributing the MBS data packets to the corresponding MCBCS Service Flow, and assigning GRE (Generic Routing Encapsulation) SN (Sequence Number) for the MBS data packets;

an MBS Synchronization Controller for generating an MBS Synchronization Rule that is applied to the MBS data packets; and an MBS Synchronization Executor for receiving the MBS Synchronization Rule and executing MBS synchronization for the MBS data packets according to the MBS Synchronization Rule, wherein the MBS Distribution DPF and the MBS Synchronization Controller are located in an ASN-GW (Access Service Network-Gateway), and wherein if the MBS Synchronization Executor does not receive a next MBS Synchronization Rule until next MBS Synchronization Rule expected TOA (Time of Arrival) included in the MBS Synchronization Rule, the MBS Synchronization Executor transmits a Recovery Request for a missing MBS Synchronization Rule to the MBS Synchronization Controller; and the MBS Synchronization Controller retransmits the missing MBS Synchronization Rule to the MBS Synchronization Executor.

\* \* \* \* \*